United States Patent [19]
Coscia et al.

[11] Patent Number: 4,781,952
[45] Date of Patent: Nov. 1, 1988

[54] DECORATIVE ARTICLE AND PROCESS FOR MAKING

[75] Inventors: Charles M. Coscia, Upper Arlington; William H. Goodburn, Columbus, both of Ohio

[73] Assignee: The D. L. Auld Company, Columbus, Ohio

[21] Appl. No.: 25,349

[22] Filed: Mar. 13, 1987

[51] Int. Cl.$^4$ .............................................. B60R 13/04
[52] U.S. Cl. ...................................... 428/31; 156/242; 428/67
[58] Field of Search ...................... 428/31, 67, 40, 343; 156/242

[56] References Cited

U.S. PATENT DOCUMENTS

| | | | |
|---|---|---|---|
| 4,100,010 | 7/1978 | Waugh | 428/42 X |
| 4,135,033 | 1/1979 | Lawton | 428/442 X |
| 4,139,654 | 2/1979 | Reed | 427/54.1 X |
| 4,292,827 | 10/1981 | Waugh | 428/542.2 X |
| 4,332,074 | 6/1982 | Auld et al. | 264/132 X |
| 4,351,686 | 9/1982 | Clark | 428/448 X |
| 4,356,617 | 11/1982 | Coscia | 264/132 X |
| 4,409,264 | 10/1983 | Gilleo et al. | 428/156 X |
| 4,446,179 | 5/1984 | Waugh | 428/31 |
| 4,460,429 | 7/1984 | Coscia et al. | 156/384 |
| 4,468,425 | 8/1984 | Gilleo et al. | 428/172 |
| 4,481,160 | 11/1984 | Bree | 428/13 X |
| 4,560,596 | 12/1985 | Coscia | 428/31 |

*Primary Examiner*—Henry F. Epstein
*Attorney, Agent, or Firm*—Killworth, Gottman, Hagan & Schaeff

[57] ABSTRACT

A decorative article is made by a process in which a substrate having an effective edge in a closed pattern on its surface receives a fluent plastic composition which is cast into an elongated area defined by the edge. Relative movement between a casting head and the substrate is effected in a direction generally parallel to the direction of elongation of the area while varying amounts of the fluent plastic composition area cast on portions of the area in relation to the widths of the portions. The fluent plastic flows to the effective edge and is then cured to form a clear plastic cap.

19 Claims, 4 Drawing Sheets

DECORATIVE ARTICLE AND PROCESS FOR MAKING

BACKGROUND OF THE INVENTION

The present invention relates to a process for making generally elongated decorative articles and to the articles made by this process and, more particularly, to a process and article in which a fluent plastic composition is cast onto a substrate in an elongated area which varies in width and/or shape.

Trim strips of various configurations and decorative articles and emblems have been used in the automotive industry to decorate and protect automobile body surfaces, and other surfaces in the passenger compartment. In recent years, emphasis has been placed on the use of plastic trim strips which do not corrode and which can be adhesively attached to the automobile body without fasteners.

One such trim strip is shown in U.S. Pat. No. 4,446,179, issued May 1, 1984, to Waugh and assigned to the assignee of the present invention. Waugh discloses a decorative trim strip which may consist of an elongate decorative foil member having thereon an impact-resistant overlay having radiused edges and providing a lens effect to the foil member. An adhesive is used to bond the trim strip to the surface to be decorated. Another trim strip is shown in U.S. Pat. No. 4,560,596, issued Dec. 24, 1985, to Coscia, and also assigned to the assignee of the present invention. Coscia discloses a trim strip which includes a foil member whose upper surface is provided with a decorative pattern. The upper surface is partially covered by a weather-resistant and impact-resistant plastic overlay having radiused edges and providing a lens effect to the foil member. The plastic overlaid section of the foil member is essentially coextensive with the width of the automotive body component to be decorated. When the trim strip is applied to the body component, the uncovered end portions of the foil member are wrapped around the component.

Recently, interest has arisen in utilizing decorative articles to cover large, irregularly shaped surface areas and components on an automobile. Previously, trim strips of the type shown in the Waugh and Coscia patents have been of a constant width and shape. This facilitates uniform casting of a fluent plastic composition onto the foil member prior to curing the composition to form the plastic overlay. When a decorative article which varies in width or shape is to be produced by casting a fluent plastic composition onto a substrate, ensuring that proper amounts of the composition are deposited on all portions of the substrate is important. One technique which has been use in the past to cast a fluent composition on a substrate in an irregular pattern is disclosed in U.S. Pat. No. 4,409,264, issued Oct. 11, 1983, to Gilleo et al, and U.S. Pat. No. 4,468,425, issued Aug. 28, 1984, to Gilleo et al. The Gilleo et al patents suggest that an irregularly shaped area defined by a pattern of a low surface energy compound, such as a flurochemical, printed on the substrate surface, can receive a quantity of a liquid resin. The substrate is then wobbled or tipped in various directions, causing the liquid resin to flow over the irregularly shaped area to the area boundaries. While this may be an acceptable technique to use with some area shapes, it is not effective when the area to be covered with a fluent composition is significantly elongated.

Thus it is seen that there is a need for an improved process for making a decorative article in which an elongated substrate area of varying width or shape is cast with a fluent composition, and for an improved decorative article made by such process.

SUMMARY OF THE INVENTION

A process according to the present invention for making decorative articles comprises the steps of (a) providing a substrate having an effective edge in a closed pattern on the surface of the substrate, which edge circumscribes an elongated area on the surface, (b) casting a fluent plastic composition from a casting head onto the substrate within the elongated area, and (c) curing the plastic composition to form a clear plastic cap. The cap provides a lens effect over the area and thereby optically enhances the appearance of the substrate, as viewed through the cap. Casting is accomplished by providing relative movement between the casting head and the substrate in a direction generally parallel to the direction of elongation of the area, while casting amounts of the fluent plastic composition on portions of the area in relation to the widths of such portions. The substrate is held substantially flat such that the fluent plastic flows to the effective edge and forms a positive meniscus.

The edge may be formed by a coating of an essentially non-wettable material in a pattern which is peripherally contiguous with the area. The substrate may be any elongate surface which is flat, or capable of being held flat during casting and curing. It may be a formed metal or a molded extruded or cast plastic which is rigid or semi-rigid; although, preferred is a flexible foil member, such as a metal foil or a metallized plastic foil, or a flexible plastic foil. The clear plastic cap may be formed of a flexible, abrasion-resistant polyurethane. The casting head may be a programmed articulated head, or a series of casting heads which are manipulated in conjunction with one another to deposit the fluent plastic over the area.

The casting head may be stationary and the substrate may be moved therebeneath. The rate of relative movement between the substrate and the casting head may be substantially constant and the fluent plastic composition may be dispensed from the casting head at a varying rate in dependence upon the width of the area. The rate of relative movement between the substrate and the casting head may vary in dependence upon the width of the area with the fluent plastic composition being dispensed from the casting head at a substantially constant rate.

The substrate may include a layer of adhesive material on the side thereof opposite to the side upon which the fluent plastic composition is cast.

An decorative article according to the present invention for covering an elongated automotive component includes a flexible substrate, an essentially non-wettable material forming a closed edge pattern on the substrate, the edge pattern circumscribing an elongated area on the substrate and defining a margin area of generally uniform dimension surrounding the area, with the elongated area increasing in width from one end thereof to the other end. A cured, clear plastic cap within the elongated area on the substrate provides a lens effect over the substrate, thereby enhancing the appearance of the substrate as viewed through the cap. A means may be provided for mounting the article on the elongated automotive component to provide a decorative covering therefore, with the margin area being wrapped around the edges of the component.

In the preferred embodiments, the substrate may be a flexible foil member, such as a metal foil or metallized plastic foil, or a flexible plastic member; although, a rigid or semi-rigid plastic or metal may be used in other embodiments. The clear plastic cap may be formed of a flexible, abrasion-resistant polyurethane. The means for mounting may include a layer of adhesive material on the side of the substrate opposite to the side upon which the fluent plastic composition is cast. The adhesive material may comprise a pressure sensitive adhesive.

Accordingly, it is an object of the present invention to provide an article and a process for making the article in which a closed, effective edge pattern is formed on a substrate and a fluent plastic composition is cast from a casting head onto the substrate within an elongated area defined by the edge pattern; to provide such an article and process in which relative movement is provided between the casting head and the substrate in a direction generally parallel to the direction of elongation of the area, while casting amounts of the fluent plastic composition on portions of the area in relation to the widths of the portions; to provide such an article and process in which the fluent plastic flows to the effective edge, forms a positive meniscus, and cures to form a clear plastic cap which provides a lens effect over the area; and to provide such an article and process in which the edge pattern defines a margin area of generally uniform dimension surrounding the elongated area.

Other objects and advantages of the invention will be apparent from the following description, the accompanying drawings and the appended claims.

DETAILED DESCRIPTION OF THE PREFERRED EMBODIMENTS

Figure 1:
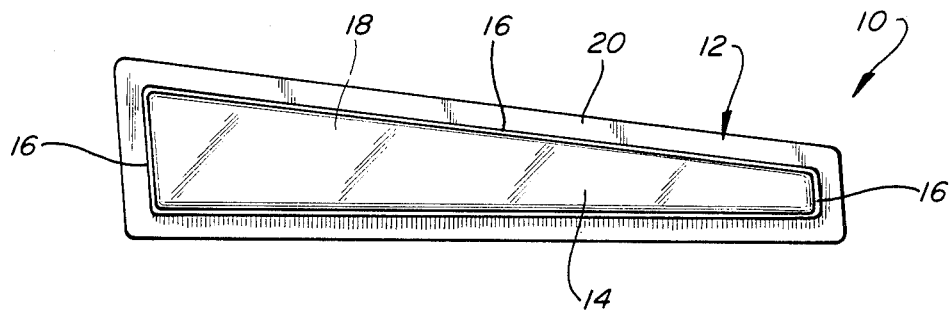
FIG. 1 is a top view of a decorative article constructed according to the present invention.
Figure 2:
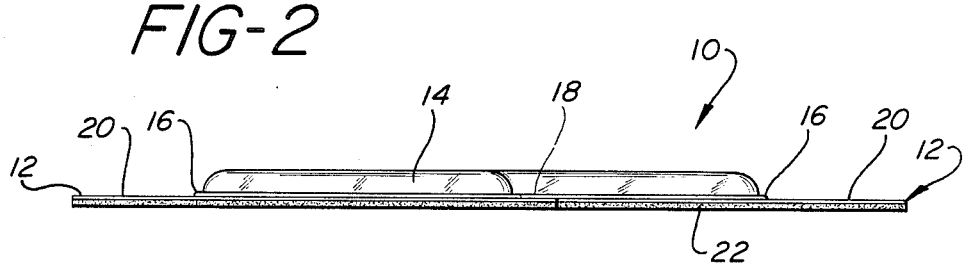
FIG. 2 is an enlarged end view of the decorative article, as seen looking right to left in FIG. 1.
Figure 3:
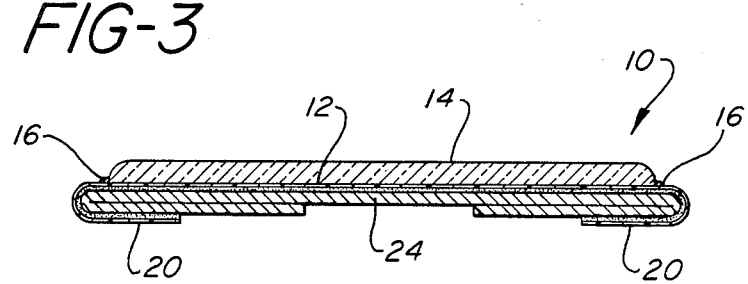
FIG. 3 is a sectional view, illustrating the decorative article as it is applied to an automotive component.

Reference is made to FIGS. 1–3 which illustrate a decorative article 10 constructed according to the present invention. This article comprises a flexible substrate 12 upon which is mounted a cured, clear plastic cap 14. The plastic cap 14, approximately 50 mils in thickness, provides a lens effect over the substrate 12. This enhances the appearance of any design or other ornamentation which may be provided on the surface of the substrate beneath the cap 14. Additionally, it has been found that the cap 14 provides an enhanced appearance for the article even if the surface of the substrate 12 is devoid of design or ornamentation.

The flexible substrate 12 may be of a number of substrate materials, including a flexible foil, a metallized plastic foil, or a flexible plastic material, such as for example a 2 mil thick layer of vinyl. Likewise, as mentioned, alternative embodiments may utilize a substrate which is rigid or semi-rigid, such as a formed metal or cast, extruded or molded plastic. As long as the substrate is flat, or capable of being held flat during casting and curing, and the plastic of plastic cap 14 adheres thereto, it may be used. The plastic cap 14 is preferably formed by casting a fluent plastic composition onto the substrate 12, as discussed below in detail. To retain the fluent plastic composition in the desired position during the casting operation and during subsequent curing, an essentially non-wettable material 16 forming a closed edge pattern is provided on the substrate 12. The thickness of material 16 is exaggerated in FIGS. 2 and 3 for purposes of clarity. The edge pattern circumscribes an elongated area 18 on the substrate and defines a margin area 20 of generally uniform dimension surrounding the elongated area 18. The elongated area 18 increases in width from one end thereof to the other end.

The essentially non-wettable material 16 may be any one of a number of materials which are known to limit the flow of a fluent plastic composition over a substrate surface, such as various fluorinated polymers. A number of suitable materials are discussed in U.S. Pat. No. 4,409,264, issued Oct. 11, 1983, to Gilleo et al. Alternatively, an effective edge to preclude the flow of the fluent composition over the substrate surface may be provided by means of a ridge which is mechanically embossed or otherwise formed in the substrate 12.

The cast plastic composition forming the clear plastic cap 14 is a thermosetting material which is weather-resistant and does not yellow or cloud as a result of prolonged exposure to sunlight and which withstands strong detergent. The cast plastic should also be resistant to abrasion and impact. A number of plastics can be used for this purpose, but one which is particularly advantageous because it satisfies all of the above needs is an impact-resistant polyurethane. Other plastics, such as acrylics and epoxies also may be used. The plastic composition preferably is cured by heat or ultraviolet radiation. Depending on the plastic used, other means such as R.F. heating and air drying may be used to harden the plastic material.

The decorative article 10 further includes a means for mounting the article, such as for example a layer 22 of adhesive material on the side of the substrate opposite the cap 14. The adhesive may preferably be a pressure sensitive adhesive. Such an adhesive may be covered with a liner sheet carrying a layer of release material until such time as the article 10 is to be applied to a support surface. FIG. 3 depicts the decorative article 10 mounted on an automotive component 24 which may, for example, be the external vertical pillar which is just to the rear of the front doors of many passenger automobiles. It should be noted that the margin area 20 overlaps the edges of the component 24, providing a neat appearance and facilitating the application of the article 10 to the component.

Reference is now made to FIGS. 4–9 which depict a number of embodiments of the process according to the present invention for making the decorative article illustrated in FIGS. 1-3. With each embodiment, a substrate 12 having an effective edge 26 in a closed pattern on the surface of the substrate is provided. The effective edge 26 circumscribes the elongated area 18 on the surface onto which the plastic composition is to be cast. This edge may be an embossed ridge or a strip of non-wettable material. The fluent plastic composition is then cast from a casting head 28 onto the substrate within the elongated area 18. Relative movement is provided between the casting head and the substrate in a direction generally parallel to the direction of elongation of the area 18 while casting amounts of the fluent plastic composition on portions of the area in relation to the widths of the portions. The substrate 12 is held substantially flat such that the fluent plastic flows to the effective edge 26 and forms a positive meniscus. Finally, the plastic composition is cured to form the clear plastic cap 14 which provides the desired lens effect.

Figure 4:
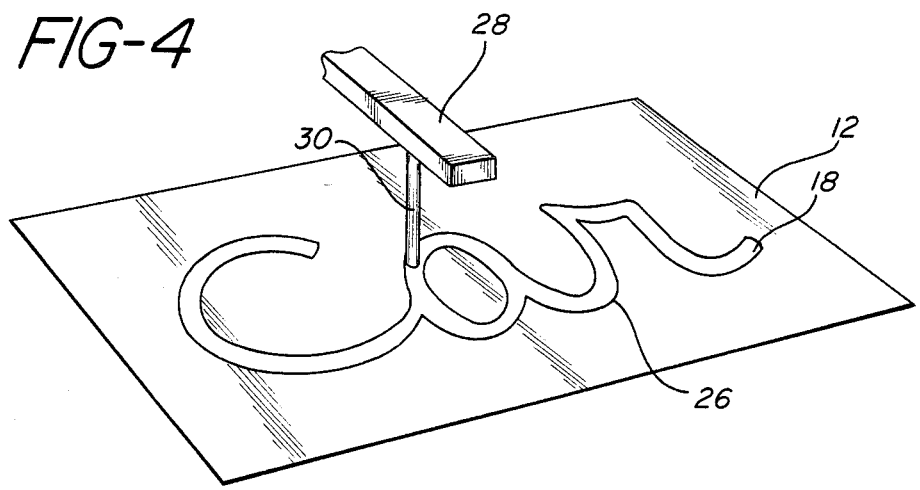
FIG. 4 is a perspective view illustrating a first embodiment of the process of the present invention.
Figure 5:
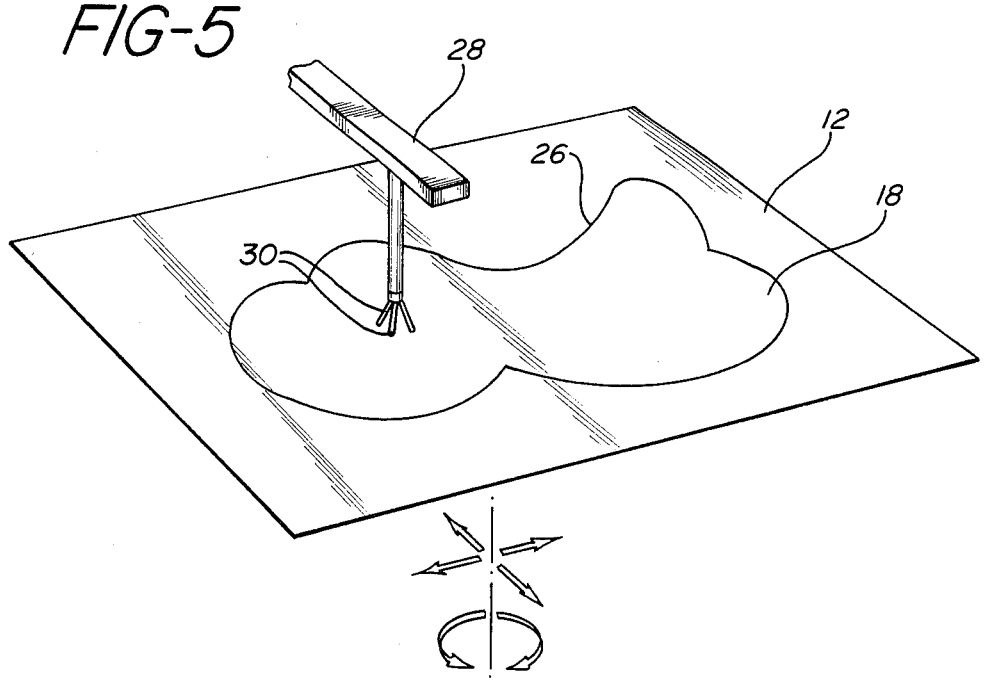
FIG. 5 is a perspective view illustrating a second embodiment of the process of the present invention.
Figure 6:
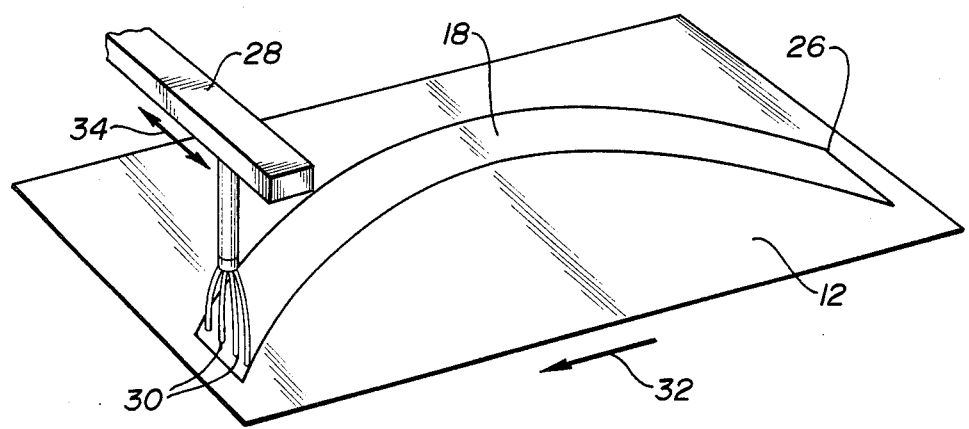
FIG. 6 is a perspective view illustrating a third embodiment of the process of the present invention.

In the embodiment of the process shown in FIG. 4, a casting head having a single nozzle 20 is caused to move in two axes so as to cast the plastic material within the area 18. The substrate 12 is maintained stationary during the casting operation. As shown in FIG. 5, however, the casting head 28 may be held stationary while the substrate 12 is moved therebeneath as required to produce an even distribution of the plastic material in area 18. Note that the casting head 28 in FIG. 5 includes multiple nozzles 30. In the embodiment of FIG. 6, the substrate 12 is translated in a direction shown by arrow 32 while the nozzles 30 of casting head 28 are shifted laterally as shown by arrow 34 so as to cast the fluent plastic material into the elongated area 18. In the embodiments of FIGS. 4-6 controlled movement of the casting head may be effected by means of an articulated head under computer control. It will be appreciated that the specific movement of the head 28 will vary depending upon the shape of the area 18 into which fluent plastic is to be cast.

Figure 7:
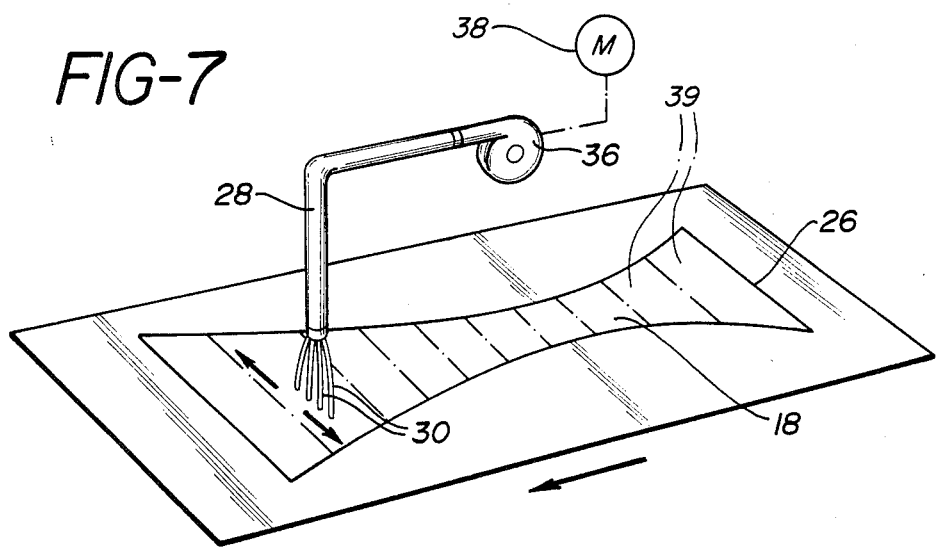
FIG. 7 is a perspective view illustrating a fourth embodiment of the process of the present invention.

In the embodiment of FIG. 7, the head 28 is maintained stationary while the substrate is translated beneath nozzles 30 at a uniform speed. it will be noted that the shape of the area 18 is such that its width varies significantly from end to end. To provide for uniform casting of the fluent plastic into the area 18, the casting pump 36 is driven at varied speeds by the motor 38 as each successive zone passes beneath the nozzles 30. The pump 36 is driven at higher speeds to effect casting of greater quantities of the plastic composition into the wider zones. The composition then flows laterally to the edges of the zones, effecting uniform coverage over area 18.

Figure 8:
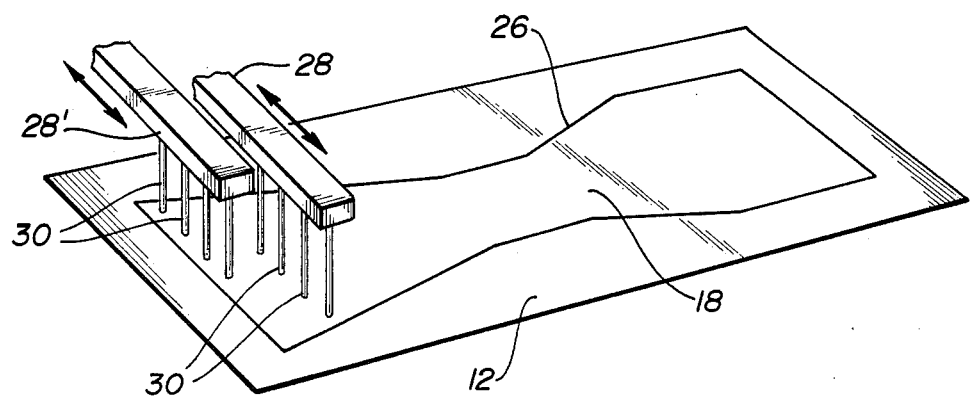
FIG. 8 is a perspective view illustrating a fifth embodiment of the process of the present invention.
Figure 9:
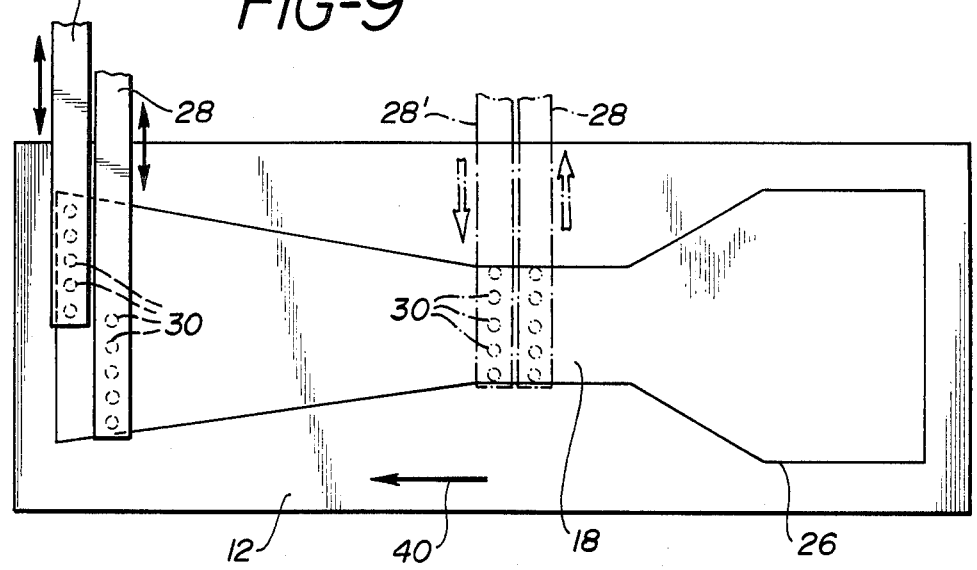
FIG. 9 is a top view, similar to FIG. 8, illustrating the fifth embodiment of the process of the present invention.

Finally, FIGS. 8 and 9 depict an embodiment in which a pair of programmed articulated heads 28 and 28' are moved laterally while the substrate 12 passes beneath the nozzles in a direction indicated by arrow 40. Note that as the nozzles pass over portions of the area 18 which are somewhat narrower they are caused to overlap. The flow of fluent plastic composition to the nozzles 30 may preferably be reduced when substantial overlap ocurs to prevent the casting of excess plastic onto the narrower portions of area 18.

Having described the invention in detail and by reference to preferred embodiments thereof, it will be apparent that modifications and variations are possible without departing from the scope of the invention defined in the appended claims.

What is claimed is:

1. A process for making decorative articles, comprising:
    (a) providing a substrate having an effective edge in a closed pattern on the surface thereof formed by a coating of an essentially non-wettable material in a pattern which is peripherally contiguous with and circumscribes an elongated area on said surface,
    (b) casting a fluent plastic composition from a casting head onto said substrate within said elongated area by providing relative movement between said casting head and said substrate in a direction generally parallel to the direction of elongation of said area while casting amounts of said fluent plastic composition on portions of said area in relation to the widths of such portions, said substrate being held substantially flat such that said fluent plastic flows to said effective edge and forms a positive meniscus, and
    (c) curing said plastic composition to form a clear plastic cap which provides a lens effect over said area and thereby optically enhances the appearance of said substrate as viewed through said clear plastic cap.

2. The process of claim 1 wherein said substrate is a flexible foil member.

3. The process of claim 2 wherein said flexible foil member is metal foil, or metallized plastic foil.

4. The process of claim 1 wherein said substrate is a flexible plastic member.

5. The process of claim 1 wherein said clear plastic cap is formed of a flexible, abrasion-resistant polyurethane.

6. The process of claim 1 wherein said casting head is a programmed articulated head.

7. The process of claim 1 wherein a series of casting heads are manipulated in conjunction with one another to deposit said fluent plastic over said area.

8. The process of claim 1 in which said casting head is stationary and the substrate is moved therebeneath.

9. The process of claim 1 in which the rate of relative movement between said substrate and said casting head is substantially constant and in which the fluent plastic composition is dispensed from said casting head at a varying rate in dependence upon the width of said area.

10. The process of claim 1 in which the rate of relative movement between said substrate and said casting head varies in dependence upon the width of said area and in which the fluent plastic composition is dispensed from said casting head at a substantially constant rate.

11. The process of claim 1 in which said substrate includes a layer of adhesive material on the side thereof opposite to the side upon which said fluent plastic composition is cast.

12. The process of claim 1 in which a plurality of casting head simultaneously cast said fluent plastic composition onto said substrate.

13. An decorative article for covering an elongated automotive component, comprising:
    a flexible substrate,
    an essentially non-wettable material forming a closed edge pattern on said substrate, said edge pattern circumscribing an elongated area on said substrate and defining a margin area of generally uniform dimension surrounding said elongated area, said elongated area increasing in width from one end thereof to the other end,
    a cured, clear plastic cap within said elongated area on said substrate which provides a lens effect over said substrate, thereby enhancing the appearance of said substrate as viewed through said clear plastic cap, and means for mounting the article on said elongated automotive component to provide a decorative covering therefore, with said margin area being wrapped around the edges of said component.

14. The article of claim 13 wherein said substrate is a flexible foil member.

15. The article of claim 14 wherein said flexible foil member is metal foil, or metallized plastic foil.

16. The article of claim 13 wherein said substrate is a flexible plastic member.

17. The article of claim 13 wherein said clear plastic cap is formed of a flexible, abrasion-resistant polyurethane.

18. The article of claim 13 in which said means for mounting includes a layer of adhesive material on the side of said substrate opposite to the side upon which said fluent plastic composition is cast.

19. The article of claim 18 in which said adhesive material comprises a pressure sensitive adhesive.

* * * * *